Sept. 23, 1941.　　　　G. HUNT　　　　2,256,714
CLUTCH
Filed June 8, 1940

Inventor
George Hunt
By
Blackmore, Spencer & Flint
Attorneys

Patented Sept. 23, 1941

2,256,714

UNITED STATES PATENT OFFICE 2,256,714

CLUTCH

George Hunt, Dayton, Ohio, assignor to General Motors Corporation, Detroit, Mich., a corporation of Delaware Application June 8, 1940, Serial No. 339,448

2 Claims. (Cl. 192—68)

This invention relates to friction clutches, such as are used to connect aligned driving and driven shafts of motor vehicles.

An object of the invention is to provide a simple, effective and inexpensive assembly adapted to releasably couple a driving member with a member to be driven.

More particularly the invention provides a novel relationship between a coned resilient clutch engaging spring plate and a flywheel cover and pressure plate assembly.

Other objects and advantages will appear from a reading of the description which follows.

Figures 1, 2:
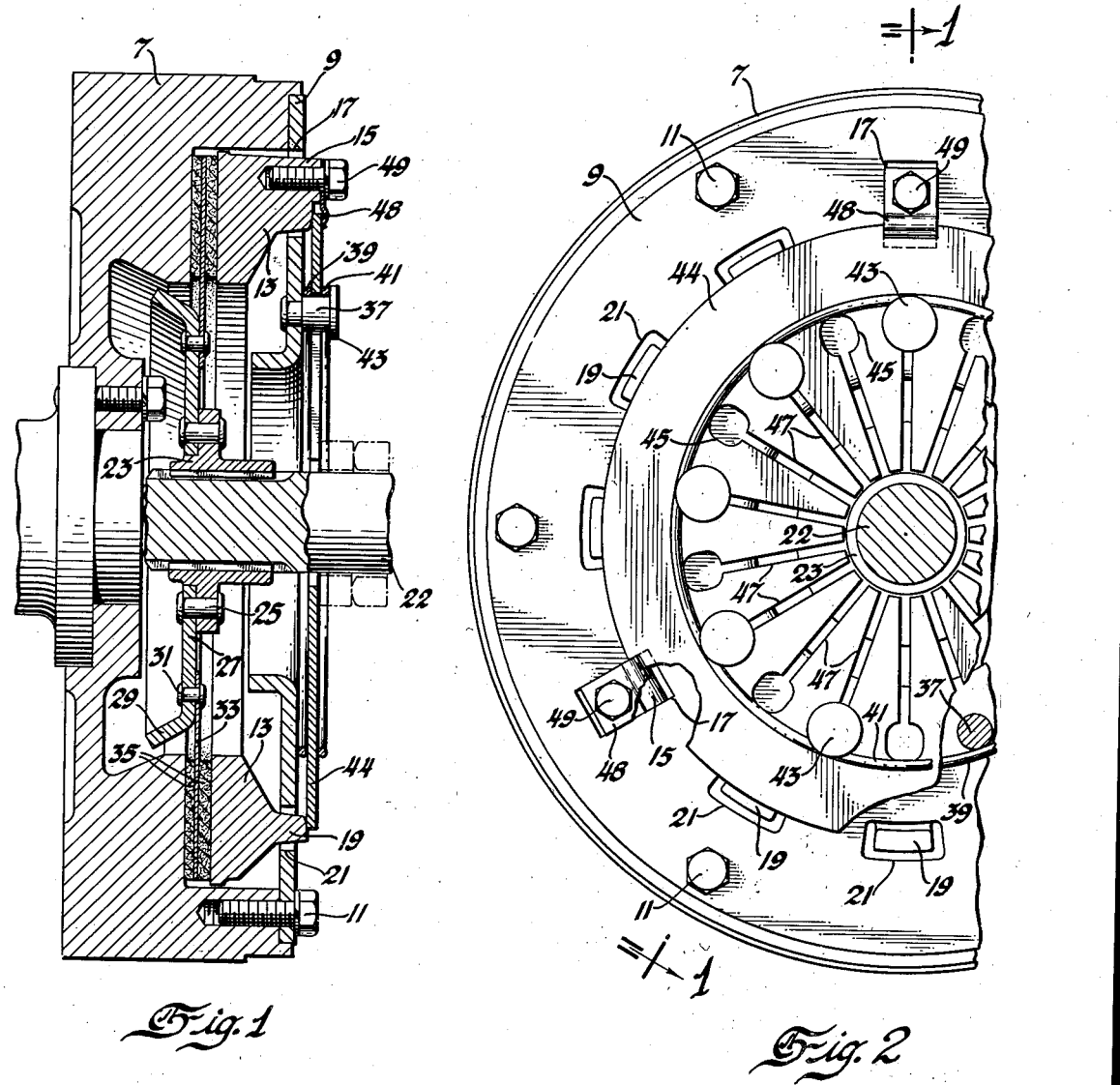
Figure 1 is a transverse section, the section being marked by line 1—1 of Figure 2.
Figure 2 shows the clutch in elevation.

On this drawing, numeral 7 is used to identify the flywheel which is as usual carried by the crankshaft of the engine of a motor vehicle. A cover 9 is secured to the flywheel at 11. Within the enclosure formed by the flywheel and cover is a pressure plate 13. The pressure plate has axial lugs 15 reciprocable through openings 17 distributed in a circular series in the cover, the lugs serving to transmit torque and to guide the pressure plate in its axial movements. There may be three of these axial lugs and guiding openings distributed symmetrically. Between the adjacent guiding lugs and openings the pressure plate has other lugs 19 extending through other and enlarged cover openings 21.

The driven member of the clutch comprises a shaft 22 carrying a hub 23 to which is secured at 25 a plate 27. At its periphery plate 27 is bent axially as at 29 to form a guard to prevent access of oil to the clutch members. Adjacent the region of bending there is secured to plate 27 at 31 a relatively thin annular driven plate element. This is preferably composed of a circular series of segments 33 and to the segments are secured facings 35 of friction material. It will be understood that axial reciprocation of the pressure plate causes the driven plate to be gripped and torque is then transmited between the driving and driven members.

To effect the above described axial movement of the pressure plate the following structure is employed. The cover has secured thereto a circular series of studs 37 with heads 43, the heads being outside the enclosure. These studs support a ring 39 which is to contact with the cover and a ring 41 to contact the heads 43. A circular spring plate 44 of conical form has openings 45 from which extend slots 47 to the central opening of the plate. The spring plate is supported by the studs 37, the studs extending through openings 45 and the rings 39 and 41 being on opposite sides of the plate. In the process of assembly the coned plate is somewhat flattened so that its periphery exerts resilient pressure on the pressure plate lugs, a pressure sufficient to effect clutch driving engagement. Under this action ring 41 receives the reaction. When pressure is applied to the inner edges of the spring plate by conventional throwout mechanism the spring plate fulcrums on ring 39 and its outer edge moves axially from the flywheel. To insure a corresponding axial movement of the pressure plate spring clips 48 are attached to guide lugs 15 by fastening means 49. These clips extend radially to an extent sufficient to overlie the outer margin of the spring plate so that in the releasing action of the latter the pressure plate is moved to its clutch releasing position.

I claim:

1. In a clutch, a cover, spring and pressure plate assembly comprising a cover having axial openings, a pressure plate having axial lugs extending through said openings, a coned spring plate having a circular periphery, said spring being supported by said cover on its side remote from said pressure plate, the periphery of the coned spring having an arcuate line contact with each of said lugs, said spring support comprising a plurality of headed studs in a circular series secured to said cover and extending from the side thereof remote from said pressure plate, said coned spring plate having apertures to receive said studs, and fulcrum rings mounted on said studs, one on each side of said spring plate and in contact with said side of the cover and with the heads of the studs.

2. In a clutch, a cover, spring and pressure plate assembly comprising a cover having axial openings, a pressure plate having axial lugs extending through said openings, a coned spring plate having a circular periphery, said spring being supported by said cover on its side remote from said pressure plate, the periphery of the coned spring having an arcuate line contact with each of said lugs, said cover plate having other openings distributed symmetrically among the first mentioned openings, said pressure plate having other lugs slidably guided in said other openings, spring clips secured to said other lugs and overlying the peripheral margin of said coned spring.

GEORGE HUNT.